US006862579B2

(12) United States Patent
Mathews et al.

(10) Patent No.: US 6,862,579 B2
(45) Date of Patent: Mar. 1, 2005

(54) SYSTEMS, METHODS AND COMPUTER PROGRAM PRODUCTS FOR PERFORMING A GENERALIZED CONTINGENT CLAIM VALUATION

(75) Inventors: Scott H. Mathews, Seattle, WA (US); Vinay T. Datar, Mercer Island, WA (US)

(73) Assignee: The Boeing Company, Seattle, WA (US)

(*) Notice: Subject to any disclaimer, the term of this patent is extended or adjusted under 35 U.S.C. 154(b) by 99 days.

(21) Appl. No.: 09/902,021

(22) Filed: Jul. 10, 2001

(65) Prior Publication Data

US 2003/0014337 A1 Jan. 16, 2003

(51) Int. Cl.[7] .............................................. G06F 17/60
(52) U.S. Cl. .......................................... 705/36; 705/35
(58) Field of Search ..................................... 705/35–40

(56) References Cited

U.S. PATENT DOCUMENTS

| | | | | |
|---|---|---|---|---|
| 5,692,233 A | | 11/1997 | Garman | |
| 6,061,662 A | * | 5/2000 | Makivic | 205/36 |
| 6,157,918 A | * | 12/2000 | Shepherd | 705/37 |
| 6,381,586 B1 | * | 4/2002 | Glasserman | 705/36 |

FOREIGN PATENT DOCUMENTS

EP          1178416 A1 *   2/2002   ........... G06F/17/60

OTHER PUBLICATIONS

Weston Copeland; *Managerial Finance*; 1990; pp. 481–487, 406–407, 642 (10 pages): 9th Edition; ISBN 0 03 0558832.

Alan Shapiro; *Modern Corporate Finance*; 1990; pp. 438, 261; ISBN 002409530–3.

* cited by examiner

*Primary Examiner*—Jagdish N. Patel
*Assistant Examiner*—Narayanswamy Subramanian
(74) *Attorney, Agent, or Firm*—Alston & Bird LLP

(57) ABSTRACT

Systems, methods and computer program products for performing a valuation of a contingent claim are provided that initially determine the present value distribution of contingent future benefits that is attributable to the exercise of a contingent claim. In this regard, the distribution of contingent future benefits is discounted according to a first discount rate, such as the weighted average cost of capital. The present value of a contingent future investment required to exercise the contingent claim is also determined based upon another appropriate discount rate, such as a risk-free rate of discounting. An average of the difference between the present value distribution of contingent future benefits and the present value of the contingent future investment is determined. By utilizing appropriate discount rates, the benefits and investment can be effectively valued, which, in turn, permits the contingent claim project to be effectively valued in an intuitive manner.

27 Claims, 7 Drawing Sheets

Distribution of the Difference between Non-lognormal Present Value Distribution of Future Benefits and Present Value of Future Investment

SYSTEMS, METHODS AND COMPUTER PROGRAM PRODUCTS FOR PERFORMING A GENERALIZED CONTINGENT CLAIM VALUATION

FIELD OF THE INVENTION

The present invention relates generally to contingent claim valuation and, more particularly, to systems, methods and computer program products for evaluating a contingent claim, such as a project having a contingent cash flow at a subsequent time.

BACKGROUND OF THE INVENTION

It is oftentimes desirable to determine the value of a contingent claim that may be exercised at some time in the future. The two most common forms of a contingent claim are a call and a put; both of which may arise in a wide variety of applications. For example, financial options commonly involve a call in which a stock or other financial instrument may be purchased at some time in the future for a predetermined price or a put in which a stock or other financial instrument may be sold at some time in the future for a predetermined price. While contingent claims frequently occur in the financial arena, contingent claims also arise in a number of other contexts, such a project evaluation as described below. Unfortunately, the contingent claims that arise in these other contexts may be more difficult to evaluate than the contingent claims that arise in the financial context since the underlying assets in these other contexts are not traded or valued by a well established market, such as the stock market in the financial arena.

By way of example of the contingent claims that occur in contexts other than the financial arena, the contingent claims that arise during project evaluation will be hereinafter described. In this regard, a number of projects are structured so as to include a contingent claim that may be exercised by one of the participants at some time in the future. The contingent claim oftentimes comes in the form of a call in which one of the participants has an option to invest additional amounts of money in order to continue the project. As such, if the initial stages of the project have proved unsuccessful and/or if the future prospects for the project appear bleak, the participant capable of exercising the call will likely decline to invest additional money and thereby forego exercise of the call and will therefore terminate its participation in the project. Alternatively, if the initial stages of the project have been successful and/or if the prospects of success of the project are bright, the participant capable of exercising the call will likely make the necessary investment in order to continue its participation in the project.

Examples of projects that include a contingent claim at some subsequent time are widely varied, but one common example involves a project having a pilot phase extending from some initial time to a subsequent time at which the contingent claim may be exercised. If the contingent claim is exercised, such as by one of the participants contributing the necessary investment to the project, the project will enter a commercial phase. As a more specific example, the project may involve research and development having staged investments in which each investment is essentially a contingent claim with the participant opting to continue with the research and development activity if the participant makes the necessary investment, but withdrawing from the research and development activity if the participant declines to make the investment. By way of other specific examples, the contingent claim may represent an option for the participant to adjust its production level at a subsequent point in time or an option to adjust its production mix in the future.

Regardless of the type of contingent claim, it is desirable to determine the value of a project and, in particular, the contingent claim at the present time. By determining the value of the contingent claim, the participant can avoid overpaying for the project as a result of an overvaluation of the contingent claim. Conversely, the participant can identify projects in which the value of the contingent claim has been undervalued and can give strong consideration to investing in these projects since they likely represent worthwhile investment opportunities.

Several techniques have been utilized to determine the value of a project having a contingent claim at a subsequent time. For reasons set forth below, each of these techniques has had difficulty evaluating projects involving real options, that is, contingent claims in real assets or real activities as opposed to financial assets; in large part since real assets and real activities are not traded in an organized market in the same manner as financial assets.

One technique that has been utilized is the net present value (NPV) method which generally understates the value of a project by ignoring the option to terminate the project at a subsequent time in order to avoid additional investment in a financially unattractive project. A second technique is a decision tree method which does account for the ability to terminate the project at a subsequent time in order to avoid further investment in a financially unattractive project, but which utilizes an incorrect discount rate. In this regard, the decision tree method does not utilize a discount rate that reflects the underlying risks associated with the contingent claim and, as such, generally overstates the value of the project.

Another technique is the Black-Scholes method, which is widely utilized for option pricing in financial markets. The Black-Scholes method can be expressed algorithmically as follows:

$$C_0 = S_0 N(d_1) - X e^{-rt} N(d_2)$$

wherein $$d_1 = ln(S_0/X) + (r + \sigma^2/2)T$$

$$d_2 = d_1 - \sigma \sqrt{T}$$

and wherein $C_0 = f(S_0, X, T, r, \sigma)$ in which $S_0$ is the value of the project without the real option, $X$ is the contingent investment, $T$ is the duration of the pilot project, i.e., that period of the project that precedes the contingent investment, $r$ is the continuously compounded, risk-free rate of interest, and $\sigma$ is a volatility parameter.

Of these parameters, $S_0$ and $\sigma$ can be estimated using the following formulae using the mean E and the variance Var of the project value at the end of the pilot project, i.e., at the subsequent time at which the contingent claim is to be exercised, in which the mean E and the variance Var are defined as follows:

$$E(S_T) = S_0 e^{\mu T}$$

$$Var(S_T) = S_0^2 e^{2\mu T}(e^{\sigma^2 T} - 1)$$

By utilizing the Black-Scholes method, the value of a project having a contingent claim or call option at a subsequent time can be properly valued so long as the various assumptions upon which the Black-Scholes formula is premised hold true. In this regard, the Black-Scholes model assumes, among other things, that the distribution of contingent future benefits is a log normal distribution. While a log normal distribution is reasonable for the evaluation of most financial options, the distribution of contingent future benefits attributable to the exercise of a real option during the course of a project may have other types of distributions such that the valuation of a project according to the Black-Scholes method in these instances may be inaccurate.

Additionally, the Black-Scholes formula presumes that the exercise of a contingent claim involves the investment of a predetermined amount of money at a single time in the future. However, some contingent claims are structured to have two or more points in time in which a participant must separately decide whether to pay additional money in order to exercise respective options. Moreover, some contingent claims are structured such that the exercise price to be paid at some time in the future is not a single predetermined amount of money, but rather is best represented by a distribution of investment levels and respective probabilities.

Furthermore, the Black-Scholes formula presumes that the potential loss at the time of exercising the contingent claim is zero since an investor will not exercise an option which will be financially unattractive. For example, if an investor has an option to purchase a stock at a future exercise time for $10, the Black-Scholes formula presumes that the investor will not exercise the option if, at the future exercise time, the stock is selling for less than $10. In contrast, the exercise of contingent claims in other contexts, such as project valuation, is oftentimes not as simple and may still include a potential loss at the time of exercising the contingent claim.

For each of the foregoing reasons, the Black-Scholes formula may therefore be inapplicable to the evaluation of contingent claims in at least some contexts outside of the financial arena. In this regard, contingent claims involving real options may not be properly evaluated by the Black-Scholes formula since the various assumptions upon which the Black-Scholes formula is premised may not hold true.

Additionally, one feature of the Black-Scholes model that was instrumental in its widespread adoption in the context of the valuation of financial options actually renders the Black-Scholes model somewhat difficult to utilize in the context of the valuation of real options. In this regard, the parameters that are utilized in order to value a financial option by means of the Black-Scholes model are relatively intuitive in the financial context. However, the application of the Black-Scholes model to the valuation of a project having a contingent claim, i.e., a real option, becomes problematic since the parameters that are utilized by the Black-Scholes model do not arise naturally in a traditional project analysis. For example, the volatility parameter required by the Black-Scholes model is not commonly utilized during the project analysis. In order to employ the Black-Scholes method, the parameters that arise naturally in the project context must be translated into the parameters that are utilized by the Black-Scholes method. This translation may become a convoluted exercise, and the process quickly loses its intuitive interpretation. Without this intuitive interpretation, project analysts may place less weight or reliance upon the value of a project determined according to the Black-Scholes model since these project analysts may not have a reasonable understanding of the methodology utilized by the Black-Scholes model. As such, the planning and auditing of the valuation of a project is generally more difficult without this intuitive interpretation.

For purposes of comparison of the traditional techniques for the valuation of a project, consider a project having the following parameters:

Mean of $S_T$=$4,375 million

Std Dev of $S_T$=$1,345 million

T=5 years r=5.5% continuous weighted average cost of capital (WACC)=10.5% continuous, and X=$5,000 million Based upon these parameters, the NPV method would underestimate the project value to be −$370 million, while the decision tree method would overestimate the project value to be $178 million. While the Black-Scholes model correctly determines the project value to be $45 million, the Black-Scholes model is somewhat difficult to utilize since the parameters cannot be directly utilized, but must first be translated as described above, thereby quickly robbing the Black-Scholes model of its intuitive interpretation. As also described above, the Black-Scholes model will generally only provide an accurate valuation of a project so long as the project adheres to all of the assumptions upon which the Black-Scholes model is premised, thereby limiting the applicability of the Black-Scholes model for purposes of contingent claims valuation outside of the financial arena.

SUMMARY OF THE INVENTION

A system, method and computer program project for performing a contingent claim valuation are therefore provided that both correctly determine the proper value of the contingent claim and are capable of intuitive interpretation. In the project analysis context, for example, the system, method and computer program product of the present invention utilize parameters that are readily available during a conventional project analysis. Based upon these parameters, the system, method and computer program product of the present invention correctly determine the value of the contingent claim by utilizing the proper discount rate and by properly considering the flexibility provided by the contingent claim that may be exercised or declined at a subsequent time. Moreover, to the extent that the system, method and computer program product of the present invention do not rely upon the same assumptions as the Black-Scholes formula, the system, method and computer program product provide a more general valuation technique. As such, the system, method and computer program product of the present invention provide a significantly improved technique for valuing a contingent claim.

The system, method and computer program product of the present invention initially determine the present value distribution of contingent future benefits that is attributable to the exercise of a contingent claim at a subsequent time. In this regard, the present value distribution of contingent future benefits is defined as the distribution of contingent future benefits that has been translated to some earlier time, such as the present time, by being discounted according to a first discount rate, such as a weighted average cost of capital. The present value of a contingent future investment required to exercise the contingent claim at the subsequent time is also determined based upon another discount rate, such as a risk-free rate of discounting, that could be different than the first discount rate. Thereafter, the value of the contingent claim is determined based upon the present value distribution of contingent future benefits and the present value of the contingent future investment. After utilizing different discount rates, such as the weighted average cost of capital and the risk-free rate of discounting, for translating the distribution of contingent future benefits and the contingent future investment to the present time, the benefits and investment can be effectively valued which, in turn, permits the contingent claim to be properly valued.

In one advantageous embodiment, the system, method and computer program product of the present invention determine the value of the contingent claim by determining an average of the difference between the present value distribution of contingent future benefits and the present value of the contingent future investment. In determining the average, the system, method and computer program product may limit the difference between the present value distribution of contingent future benefits and the present value of the contingent future investment to a minimum value of zero in instances in which the present value distribution of contingent future benefits is less than a difference of the present value of the contingent future investment and the potential loss that remains as a possible outcome at the time at which the contingent claim is to be exercised. In contrast to the Black-Scholes model which is premised upon the potential loss at the time of exercising the contingent claim being zero, the system, method and computer program product of this embodiment provide more flexibility by permitting a contingent claim to be effectively valued even though the potential of a loss may still exist at the time of exercising the contingent claim.

In further contrast to the Black-Scholes model, the system, method and computer program product of the present invention are also no longer dependent upon a number of the other assumptions upon which the Black-Scholes model is premised. In this regard, the distribution of contingent future benefits may have a distribution other than log normal with the system, method and computer program product of the present invention still being capable of effectively evaluating the contingent claim. Additionally, the system, method and computer program product are preferably able to effectively value a contingent claim even in instances in which the contingent future investment is actually a distribution of contingent future investments required to exercise the contingent claim at the subsequent time. Still further, the system, method and computer program product of one advantageous embodiment are capable of performing a contingent claim valuation on each of a series of contingent claims, as opposed to the single contingent claim which the Black-Scholes method is capable of evaluating. In this embodiment, the determination of the present value distribution of contingent future benefits, the present value of a contingent future investment and the value of a contingent claim is repeated in order to value each of the series of contingent claims. Thereafter, the valuation of each contingent claim is refined with the determination of the present value distribution of future benefits of a respective contingent claim being recomputed with the distribution of future benefits being represented by the value previously determined for the immediately succeeding contingent claim. As such, the system, method and computer program product of the present invention offer significant flexibility with respect to the contingent claims that may be effectively valued; which flexibility is particularly useful in the valuation of contingent claims involving real options that will be much less likely than financial options to comply with the various assumptions upon which the Black-Scholes model is premised.

In one example, the project includes a pilot phase extending from an initial time to a subsequent time at which the contingent claim may be exercised. If the contingent claim is exercised, the commercial phase of the project commences. In this example, the distribution of contingent future benefits consists of the distribution of net operating profits at the subsequent time contingent upon the exercise of the contingent claim. By applying the first discount rate to the distribution of the net operating profits, the distribution of net operating profits can be translated to the present time. As will be apparent, the distribution of net operating profits at the subsequent time at which the contingent claim may be exercised is commonly available in traditional project analysis. In addition, the first discount rate that is utilized to translate the distribution of net operating profits to the present time is typically the weighted average cost of capital which is a common discount rate utilized by project analysts, such as in a conventional net present value analysis. As such, the parameters utilized by the system, method and computer program product of the present invention are readily available and well known to project analysts, and the resulting valuation methodology is therefore intuitive for project analysts, thereby providing further credibility in the resulting valuation.

BRIEF DESCRIPTION OF THE DRAWINGS

Figure 1:
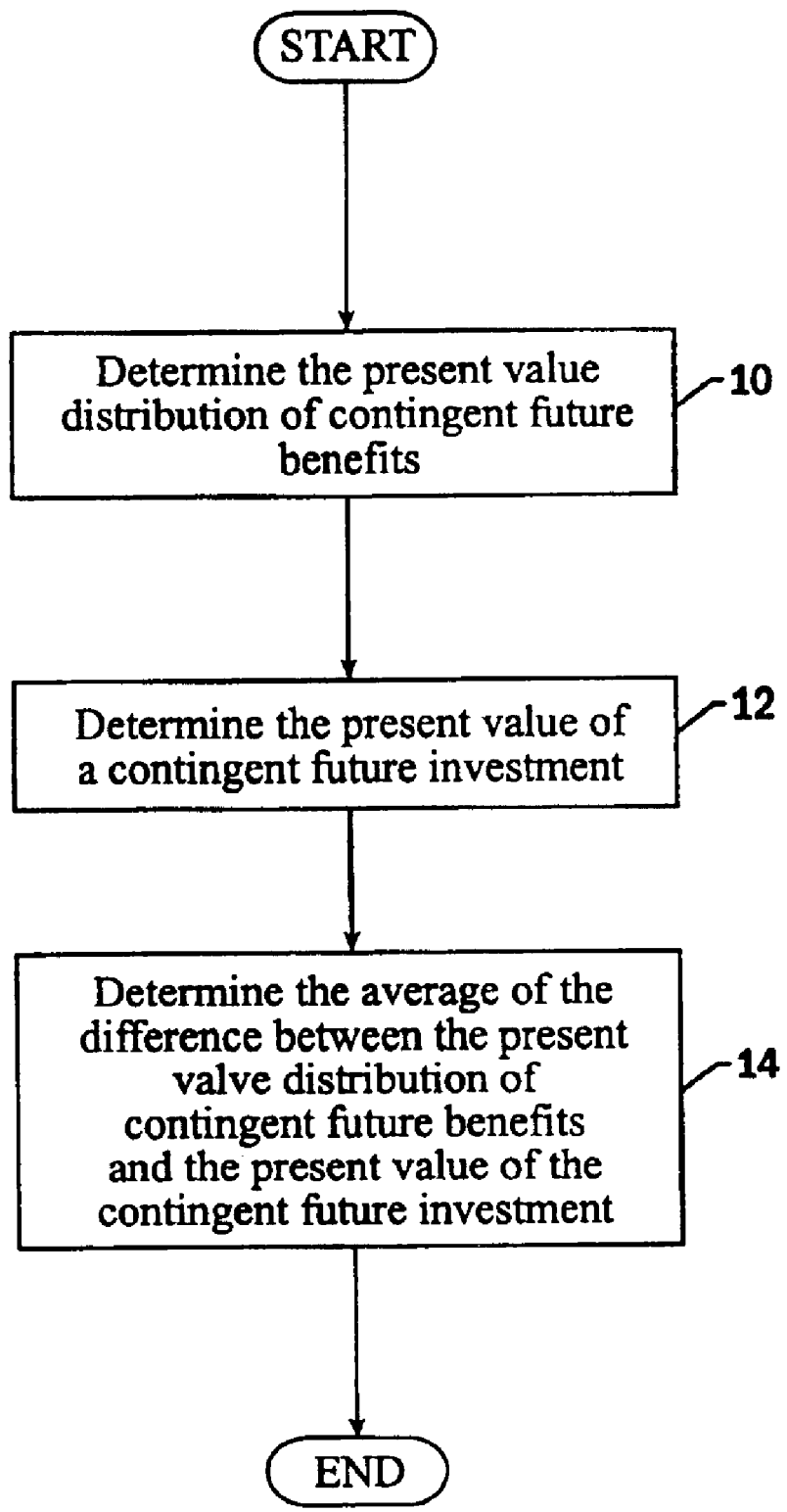
Figure 2:
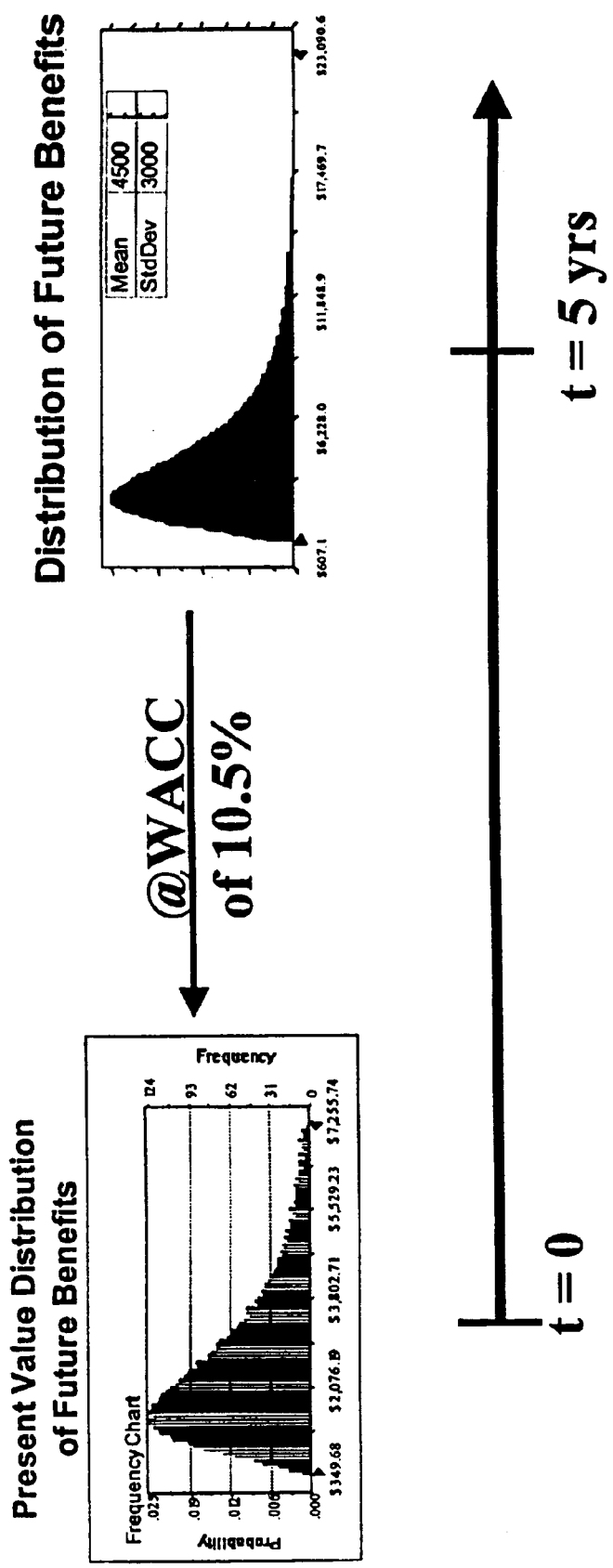
Figure 3:
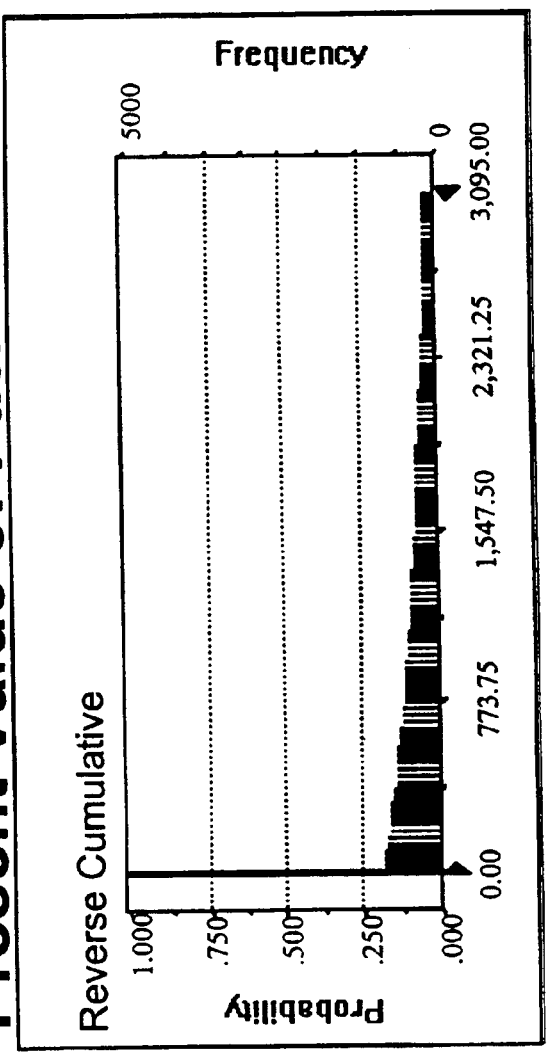
Figure 4:
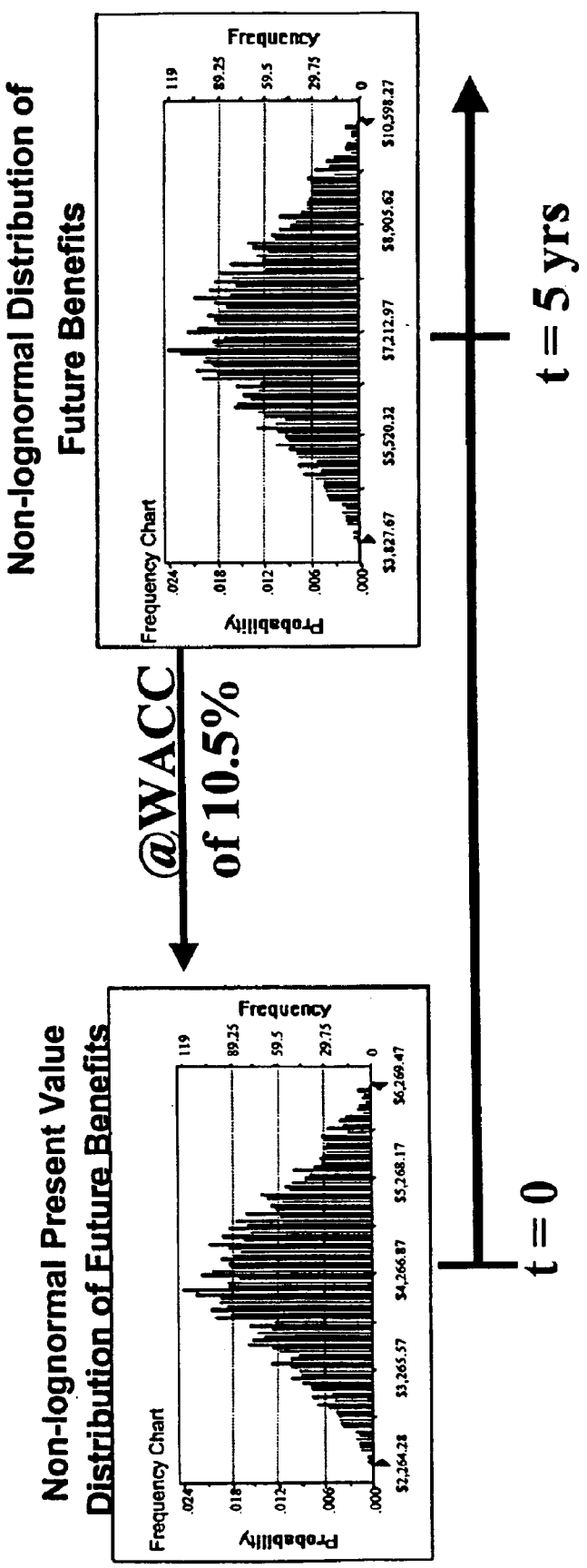
Figure 5:
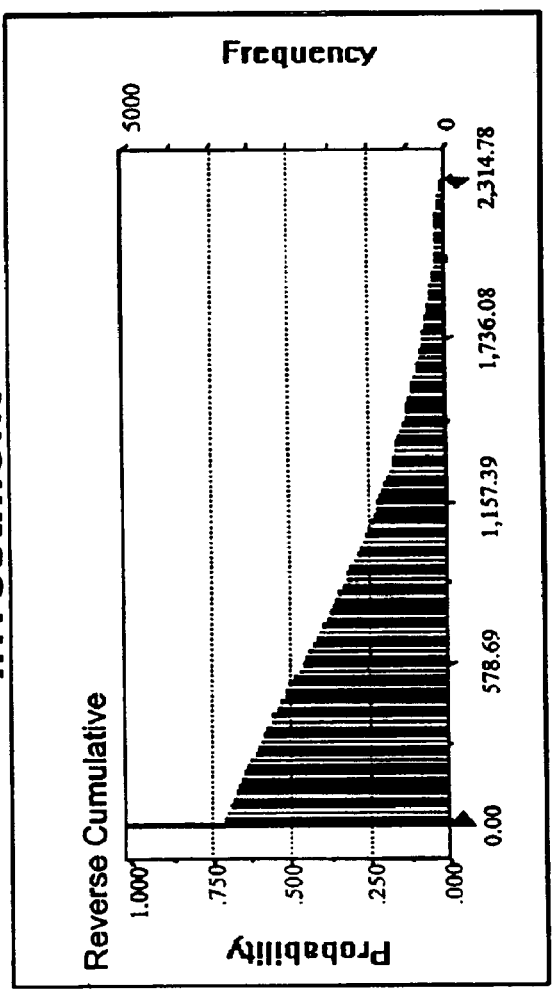
Figure 6:
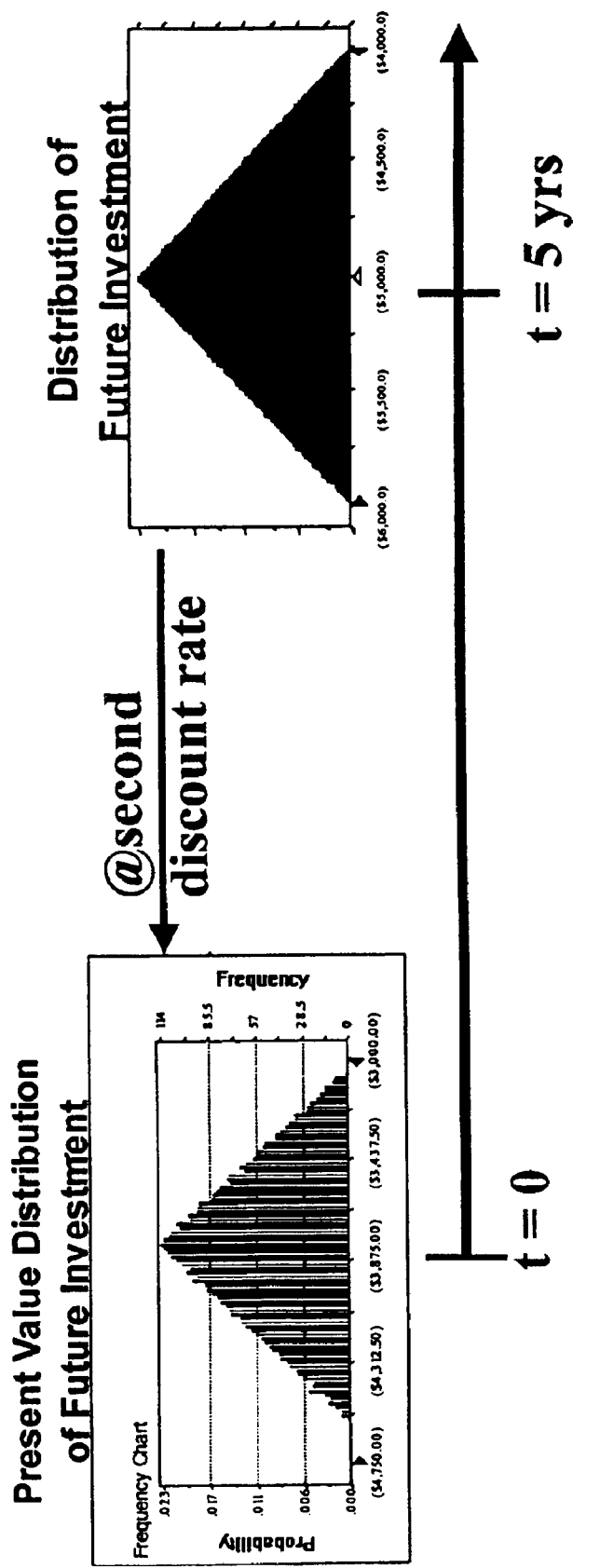
Figure 7:
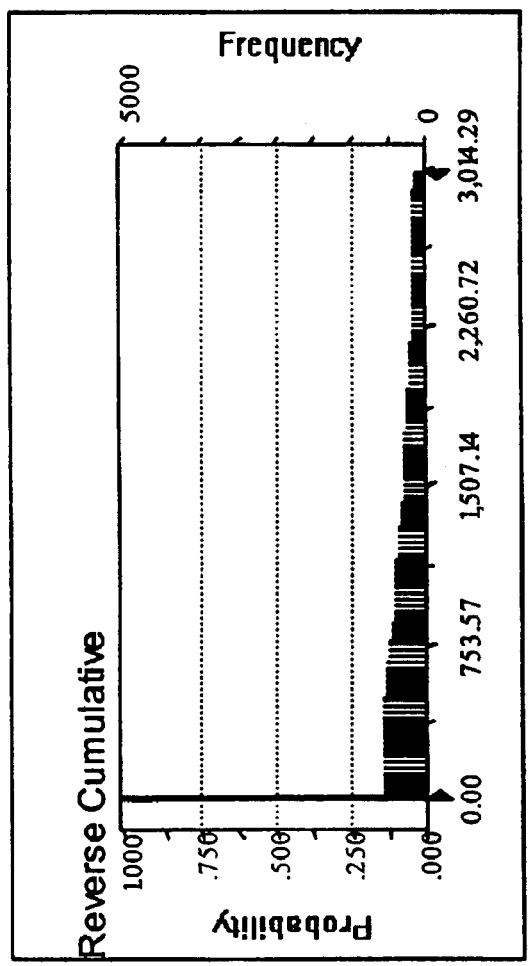

Having thus described the invention in general terms, reference will now be made to the accompanying drawings, which are not necessarily drawn to scale, and wherein:

FIG. 1 is a flow chart illustrating the operations performed by the system, method and computer program product of one embodiment of the present invention;

FIG. 2 is a graphical representation of a distribution of contingent future benefits at a time T, as well as a translation of the distribution of contingent future benefits to the present time according to a system, method and computer program product of one embodiment of the present invention;

FIG. 3 is a graphical representation in reverse cumulative format of the difference between the present value distribution of contingent future benefits depicted in FIG. 2 and the present value of a contingent future investment of $5 billion with the minimum difference being limited to zero;

FIG. 4 is a graphical representation of a non-log normal distribution of contingent future benefits at a time T, as well as a translation of the distribution of contingent future benefits to the present time according to a system, method and computer program product of one embodiment of the present invention;

FIG. 5 is a graphical representation in reverse cumulative format of the difference between the present value distribution of contingent future benefits depicted in FIG. 4 and the present value of a contingent future investment of $5 billion with the minimum difference being limited to zero;

FIG. 6 is a graphical representation of a distribution of contingent future investments at time T, as well as a translation of the distribution of contingent future benefits to the present time according to a system, method and computer program product of one embodiment of the present invention; and FIG. 7 is a graphical representation in reverse cumulative format of the difference between the present value distribution of contingent future benefits depicted in FIG. 2 and the present value of a contingent future investment of $5 billion with the minimum difference being limited to zero in instances in which the present value distribution of contingent future benefits is less than a difference of the present value of the contingent future investment and a potential loss of $500 million that still exists at the time at which the contingent claim is to be exercised.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

A system, method and computer program product are therefore provided for performing a valuation of a contingent claim, such as a call option or a put option, at a time prior to exercise of the contingent claim. In this regard, the system, method and computer program product will be described in conjunction with the valuation of a contingent claim at the current time, i.e., t=0. However, in determining the present value of a contingent claim, the system, method and computer program product are capable of determining the present value of the contingent claim at any time prior to the exercise of the contingent claim such that subsequent discussion of present value therefore including a valuation at any time prior to the exercise of the contingent claim.

The methodology of the present invention, generically termed the Datar-Mathews (DM)™ algorithm, determines the same value for the project as does the Black-Scholes method in instances in which the various assumptions upon which the Black-Scholes formula is premised are met. However, the methodology of the present invention is more intuitive than the Black-Scholes method, particularly in the project analysis context as a result of its direct utilization of data available from a conventional project analysis. Moreover, the system, method and computer program product of the present invention are not contingent upon as many assumptions as the Black-Scholes model and, as such, is more flexible as to the type of contingent claims that may be effectively evaluated.

The system, method and computer program product may be utilized to perform a valuation of a variety of contingent claims. These contingent claims may be either calls or puts, although calls will be discussed hereinafter by way of example. In addition, the contingent claims may arise in a variety of contexts. For example, the contingent claim may involve the exercise of a real option, that is, an option that may be exercised at some point in time in the future in order to exploit or to continue to exploit a real asset or real activity, as opposed to a financial asset. In this regard, the real option may arise during a project analysis as discussed in detail below for purposes of example. However, the contingent claim may involve the exercise of other types of options, including financial options. In this regard, the system, method and computer program product of the present invention may provide advantages relative to the Black-Scholes method even in the context of evaluating financial options since the methodology of the present invention is not constrained by the assumptions upon which the Black-Scholes formula is premised.

Even with respect to project analysis, however, the system, method and computer program product are capable of performing a valuation of the contingent claims present in a wide variety of projects. In this regard, the project may have a pilot phase extending from some initial time to a subsequent time at which the contingent claim is to be exercised. If the contingent claim is exercised, such as by one of the participants contributing the necessary investment to the project, the project of this example will enter a commercial phase. As a more specific example, the project may involve research and development having staged investments in which each investment is essentially a contingent claim with the participant opting to continue with the research and development activity if the participant makes the necessary investment, but withdrawing from the research and development activity if the participant declines to make the investment. By way of other specific examples, the contingent claim may represent an option for the participant to adjust its production level at a subsequent point in time or an option to adjust its production mix in the future. While various examples have been provided, it should be understood that the system, method and computer program product may be utilized to evaluate a number of other contingent claims, both in the project analysis context and in other contexts, if so desired.

According to the present invention, the present value of future benefits is initially determined as shown generically in block 10 of FIG. 1. The future benefits are typically expressed as a distribution of future benefits that would flow from the underlying asset. As shown in FIG. 2, the distribution of future benefits generally assigns a probability to each respective value of the future benefits. For example, the distribution of future benefits may represent a distribution of the net operating profit associated with a project following the exercise of a contingent claim at the subsequent time, t=T. However, the distribution of future benefits may represent a wide variety of other types of future benefits depending upon the context.

The distribution of future benefits may be developed in any manner known to those skilled in the art. In the context of a project, for example, project analysts or cost engineers may develop the distribution of future benefits based upon market studies, cost analyses and a myriad of other factors as known to those skilled in the art.

In order to determine the present value of the future benefits, such as at t=0, the distribution of future benefits is discounted by a first discount rate. The first discount rate is preferably selected to take into account the risk associated with the distribution of future benefits as known to those skilled in the art. In some embodiments, however, the weighted average cost of capital (WACC) is utilized as the first discount rate. For the example depicted in FIG. 2, the distribution of net operating profit at time t=T is discounted by a WACC of 10.5% to create the present value distribution of net operating profit at time t=0. While the first discount rate is preferably selected to be appropriate for the particular situation, the WACC is commonly utilized since it provides an average discount rate with which most analysts are familiar. In this regard, project analysts generally utilize the WACC in project evaluations employing the net present value method. By translating the distribution of future benefits to the present time by means of a discount rate, the WACC, which is readily available and with which most analysts are familiar, the intuitive interpretation or transparency of the system, method and computer program product of the present invention is therefore enhanced.

With respect to the example depicted in FIG. 2, it is noted that dollar values (in billions of dollars) associated with the distribution of future benefits and the present value distribution of future benefits are provided. It should be understood, however, that the specific dollar values are merely for purposes of illustration and scale and are not intended to limiting in any fashion as to the type of distributions of future benefits that may be analyzed.

Moreover, the distribution of future benefits depicted in FIG. 2 and described above is a single distribution of future benefits at time t=T. In some situations, the distribution of future benefits may actually be a series of future benefits, each of which may have a different distribution, that occur at various times, such as annually, following the exercise of the contingent claim. In these situations, the system, method and computer program product of the present invention preferably determine the cumulative present value distribution of the entire series of future benefits. This determination may be made in several manners including translating each future benefit to the time at which the contingent claim is to be exercised, i.e., t=T, and then summing the contributions of each future benefit following translation to create a single distribution of future benefits at time t=T; which single distribution of future benefits is then translated to the present time in the manner described above. Alternatively, each future benefit may be separately translated to the present time and then summed to determine the present value distribution of future benefits. In either situation, each future benefit may be discounted at either the same discount rate as or a different discount rate from other future benefits, depending upon the risk associated with the respective future benefit.

In addition to determining the present value of future benefits, the present value of the contingent future investment is determined as shown in block 12 of FIG. 1. In this regard, the contingent future investment is typically the cost of the contingent claim or call at the subsequent time t=T. In order to determine the present value of the contingent future investment, the contingent future investment is discounted by an appropriate discount rate that may be different than the first discount rate at which the distribution of contingent future benefits is discounted. The discount rate is preferably selected to take into account the risk associated with the contingent claim as described above and known to those skilled in the art. In some embodiments, the risk free rate of discounting is utilized. In other embodiments, however, the contingent future investment is subject to a non-market or corporate risk such that the appropriate discount rate is the corporate bond rate.

Thereafter, the value of one contingent claim, such as the value of the project in the foregoing example, is determined based upon the present value distribution of contingent future benefits and the present value of the contingent future investment. Typically, the value of the contingent claim is determined by determining the average difference between the present value distribution of contingent future benefits and the present value of the contingent future investment taking into account the relative probabilities associated with distribution of difference values. See block 14 of FIG. 1. By way of example, in the context of the project depicted in FIG. 2, the contingent future investment at time t=5 years is $5 billion which is discounted to the current time t=0 at a risk free rate of discounting of 5.5% to a present value of $3.79786 billion. The average difference between the present value distribution of the contingent future benefits and this present value of the contingent future investment is then determined. In determining the average difference between the present value distribution of the contingent future benefits and the present value of the contingent future investment, a limit on the minimum permissible difference may be established to take into account those situations that may exist at the time at which the contingent claim is to be exercised which would cause a participant to fail to exercise the contingent claim. In this regard, limiting the minimum permissible difference to zero takes into account those situations in which the exercise of the contingent claim would otherwise create a loss since a reasonably prudent participant will fail to exercise the contingent claim in these situations.

By way of example, FIG. 3 depicts the difference in reverse cumulative format between the present value distribution of contingent future benefits shown in FIG. 2 and the present value of the corresponding contingent future investment of $3.79786 billion subject to the constraint that the minimum permissible difference is zero. All nonpermissible differences are set to zero. As will be apparent, a reverse cumulative distribution depicts the number, proportion or percentage of values greater than or equal to a given value. With reference to FIG. 3, for example, there is a probability of 1.0 that the difference between the present value distribution of contingent future benefits and the present value of the contingent future investment will be 0 or greater, while there is a probability of about 0.12 that the difference between the present value distribution of contingent future benefits and the present value of the contingent future investment will be $773.75 million or greater. It is also noted from the exemplary distribution depicted in FIG. 3, that a sizeable percentage, such as about 80% or so, of the difference values have been set to zero, thereby indicative of situations existing at the time at which the contingent claim is to be exercised which would cause a participant to fail to exercise the contingent claim, such as those situations in which the exercise of the contingent claim would otherwise create a loss as described above.

Based on the distribution of difference values depicted in FIG. 3, the average difference may then be determined by taking into account the relative probabilities associated with the distribution of difference values. This average difference between the present value distribution of contingent future benefits and the present value of the contingent future investment is the present value of the contingent claim such as the project in this instance, and equals the value that would be determined according to the Black-Scholes method in instances in which the assumptions on which the Black-Scholes method are premised are satisfied.

Although not wishing to be bound by theory, the equivalence of the methodology of the present invention with the Black-Scholes method in instances in which the assumptions upon which the Black-Scholes formula are met may be proved mathematically. In this regard, the valuation of a contingent claim determined according to the present invention can be represented as:

$$E[\max(s_T e^{-\mu T} - xe^{-rT}, 0)] = \int_{-xe^{-rT}}^{\infty} (s_T e^{-\mu T} - xe^{-rT})g(y)dy \quad (1)$$

wherein $s_T$ is the random value of the underlying asset at time T, $\mu$ is first discount rate, T is the time until the contingent claim may be exercised, x is the contingent future investment, r is the second discount rate, y equals $s_T e^{-\mu T}$, and g(y) is the probability density of y. Equation (1) can then be translated into a form more similar to the Black-Scholes formula by the following substitutions:

$$\begin{aligned} E[\max(s_T e^{-\mu T} - xe^{-rT}, 0)] &= \int_{-xe^{-rT}}^{\infty} (s_T e^{-\mu T} - xe^{-rT})g(y)dy \quad (2) \\ &= E(s_T e^{-\mu T})N_{d_1} - xe^{-rT}N_{d_2} \\ &= S_0 N_{d_1} - xe^{-rT}N_{d_2} \end{aligned}$$

wherein $$d_1 = \frac{\ln(S_0/xe^{-rT}) + s^2/2}{s} \quad (3)$$

$$d_2 = \frac{\ln(S_0/xe^{-rT}) - s^2/2}{s} \quad (4)$$

$$s = \text{std dev of } \ln(s_T e^{-\mu T}) \quad (5)$$

and wherein $S_0$ equals $E(s_T e^{-\mu T})$.

In addition, it is known that:

$$\ln\left(\frac{s_T}{s_0}\right) \sim \phi\left[\left(\mu - \frac{\sigma^2}{2}\right)T, \sigma\sqrt{T}\right] \quad (6)$$

$$\therefore \ln s_T \sim \phi\left[\ln s_0 + \left(\mu - \frac{\sigma^2}{2}\right)T, \sigma\sqrt{T}\right] \quad (7)$$

$$\therefore \ln(s_T e^{-\mu T}) \sim \phi\left[-\mu T + \ln s_0 + \left(\mu - \frac{\sigma^2}{2}\right)T, \sigma\sqrt{T}\right] \quad (8)$$

wherein $\phi$ denotes a normal distribution and $\sigma$ is the volatility parameter utilized in the Black-Scholes method. As such, the definition of s provided by equation (4) is therefore equal to $\sigma\sqrt{T}$. By substituting this definition of s into equations (3) and (4), $d_1$ and $d_2$ may be rewritten as follows:

$$d_1 = \frac{\ln\left(\frac{S_0}{x}\right) + \left(r + \frac{\sigma^2}{2}\right)T}{\sigma\sqrt{T}}$$

$$d_2 = \frac{\ln\left(\frac{S_0}{x}\right) - \left(r + \frac{\sigma^2}{2}\right)T}{\sigma\sqrt{T}}$$

As described above equations (2), (3) and (4) collectively represent the Black-Scholes formula, thereby proving mathematically the equivalence of the methodology with the Black-Scholes formula in instances in which the assumptions upon which the Black-Scholes formula are based are met.

Advantageously, the parameters utilized by the system, method and computer program product of the present invention are readily available, such as in the context of most conventional project analysis techniques. One such parameter is the distribution of future benefits, such as the distribution of net operating profits, that would flow from the underlying assets. Other parameters are the discount rate, such as the WACC, utilized to translate the distribution of the contingent future benefits to the present time, the contingent future investment and the discount rate, such as the risk free rate of discounting, utilized to translate the contingent future investment to the present time. The system, method and computer program product of the present invention are quite intuitive or transparent to analysts, thereby increasing the likelihood that the methodology employed by the present invention will be accepted by the industry and adding to the credibility of the resulting contingent claim valuations. As a result of the intuitive interpretation of the methodology of the present invention, the planning and auditing of the contingent claim valuations determined by the system, method and computer program product of the present invention should also be facilitated.

Additionally, the validity of the valuations determined by the system, method and computer program product of the present invention are not dependent upon the assumptions that underlie the Black-Scholes model. In particular, the system, method and computer program product can effectively value distributions of future benefits that are not log normal, as otherwise required by the Black-Scholes model. As such, the system, method and computer program product are quite flexible; a characteristic that is particularly useful in the valuation of contingent claims, such as projects having real options, that are more likely to produce non-log normal distributions of future benefits than financial options.

By way of example, FIG. 4 depicts a distribution of contingent future benefits that is not log normal. As shown graphically in FIG. 4, the non-log normal distribution of future benefits is translated to the present time by discounting the distribution and future benefits by the WACC. According to the system, method and computer program product of the present invention, the value of the contingent claim is determined based upon the present value non-log normal distribution of future benefits and the present value of the contingent future investment as described above. In this regard, the difference between the present value non-log normal distribution of contingent future benefits and the present value of the contingent future investment is depicted in reverse cumulative format in FIG. 5. Based upon the distribution of difference values depicted in FIG. 5, the average difference may then be determined by taking into account the relative probabilities associated with distribution of difference values in order to determine the present value of the contingent claim. As such, the system, method and computer program product of the present invention can determine the present value of contingent claims having a wide variety of distributions of contingent future benefits that are not limited to an analysis of distributions of contingent future benefits that are log normal as is the Black-Scholes model.

As described above in the foregoing examples and as required by the Black-Scholes model, the contingent future investment has been described to be a single payment that has a predetermined value. In some applications, however, the contingent future investment may not have a single value, but may be best represented by a distribution of contingent future investments which relate probabilities to each of a plurality of different contingent future investments. In this regard, FIG. 6 depicts a distribution of contingent future investments and the probabilities that the respective contingent future investments will be paid at the time of exercising the contingent claim. Obviously, at the time at which the contingent claim is to be exercised, the participant will only be required to make a single investment. However, in analyzing the contingent future investment at the present time, the contingent future investment has a range of potential values, each having an associated probability.

In order to determine the value of the contingent claim in instances in which the contingent future investment is best represented by a distribution, the distribution of contingent future benefits is translated to the present time by means of an appropriate discount rate, such as a risk-free rate of discounting, the corporate bond rate or the like. The difference between the present value distribution of contingent future benefits and the present value distribution of the contingent future investments is then determined. In this regard, the difference between a respective future benefit value and each of a plurality of future investment values from the distribution of contingent future investments is determined for each of a plurality of future benefit values. The average of the differences is then determined. As before, the minimum difference may again be limited, such as to zero, in the manner described above. The average of the differences between the distribution of contingent future benefits and the distribution of contingent future investments is the value of the contingent claim. As such, the system, method and computer program product of the present invention are capable of determining the value of a contingent claim even in instances in which the contingent future investment is best represented by distribution, thereby further increasing the flexibility of the methodology of the present invention.

A system, method and computer program product of one embodiment of the present invention is also capable of determining the value of a contingent claim in instances in which a potential loss at the time of exercising a contingent claim is not zero, but is some other value. Unlike the exercise of financial options in which the potential loss at the time of exercising the financial option is zero since it is presumed that an investor will not exercise a financial option in instances in which the exercise of the financial option will cause a loss, such as by purchasing stock through the exercise of the financial option for a higher price than the stock is currently traded over the counter, in some applications, such as the valuation of projects, the project may still have a potential loss at a time of exercising the contingent claim. In one example depicted in FIG. 7, the participant is required to exercise a contingent claim by investing $5 billion with a potential loss of $500 million being possible before the participant could terminate the project. In order to effectively value the contingent claim in this situation, both the distribution of contingent future benefits and the contingent future investment are translated to the present time by means of discounting by the appropriate discount rate(s). Thereafter, a difference, not just between the present value distribution of contingent future benefits and the contingent future investments, but between the present value distribution of contingent future benefits and the difference of the present value of the contingent future investment and the potential loss at the time of exercising the contingent claim is determined. In instances in which difference would be negative, the difference is set to zero. Thereafter, the average difference is determined to be the value of the contingent claim in this situation, thereby effectively valuing a contingent claim even in instances of imperfect pruning so as to further increase the flexibility of the system, method and computer program product of the present invention. See, for example, FIG. 7 in which the distribution of difference values is depicted for the foregoing example in reverse cumulative format.

In further contrast to the Black-Scholes model which can accommodate a single contingent claim, the system, method and computer program product of one advantageous embodiment of the present invention are capable of valuing a series of contingent claims which occur at different points in time in the future. In this situation, a participant will make an election two or more times during the course of a project or the like by making further investments in the project or by terminating its further participation. In order to effectively evaluate the series of contingent claims, the system, method and computer program product of this embodiment initially performs a separate contingent claim valuation for each contingent claim. Thereafter, the valuation of each contingent claim is refined by again determining the valuation for each contingent claim, albeit with the value of the immediately succeeding contingent claim serving as the distribution of contingent future benefits for during the valuation of the prior contingent claim. By effectively valuing a series of contingent claims, the flexibility of the system, method and computer program product of the present invention is further enhanced.

For each of the reasons described above, the system, method and computer program product of the various embodiments of the present invention are not limited to the evaluation of contingent claims that meet all of the assumptions upon which the Black-Scholes model is premised. Therefore, the system, method and computer program product of the present invention are much more flexible than the Black-Scholes model. Thus, while the system, method and computer program product of the present invention can effectively evaluate contingent claims in the financial arena, the system, method and computer program product of the present invention are particularly well suited to the evaluation of projects or other situations involving real options since these situations oftentimes do not meet each of the assumptions upon which the Black-Scholes model is premised and can therefore not properly be evaluated by the Black-Scholes model. Moreover, even if a contingent claim could be properly evaluated by the Black-Scholes model, the system, method and computer program product of the present invention utilize parameters that are much more commonly available to project analysts and the like and are therefore more intuitive and transparent to the project analysts, thereby increasing the credibility of the valuation provided by the system, method and computer program product of the present invention.

The system of the present invention is typically embodied by a processing element and an associated memory device, both of which are commonly comprised by a computer or the like. As such, the system of the present invention generally operates under control of a computer program product according to another aspect of the present invention. The computer program product for performing the contingent claim valuation includes a computer-readable storage medium, such as the non-volatile storage medium, and computer-readable program code portions, such as a series of computer instructions, embodied in the computer-readable storage medium.

In this regard, FIG. 1 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. By way of but one example, the contingent claims valued by the system, method and computer program product of the present invention may be American style calls, as opposed to the European style calls referenced in the above-described examples. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for performing a contingent claim valuation comprising:
   determining a present value distribution of contingent future benefits attributable to the exercise of the contingent claim at a subsequent time, wherein determining the present value distribution of contingent future benefits comprises discounting a distribution of contingent future benefits according to a first discount rate;
   determining a present value of a contingent future investment required to exercise the contingent claim at the subsequent time based upon a second discount rate that need not equal the first discount rate; and
   determining a value of the contingent claim based upon the present value distribution of contingent future benefits and the present value of the contingent future investment,
   wherein at least one of the determining steps is performed by a processing element.

2. A method according to claim 1 wherein determining the value of the contingent claim comprises determining an average of the difference between the present value distribution of contingent future benefits and the present value of the contingent future investment.

3. A method according to claim 2 wherein, at the time at which the contingent claim is to be exercised, a potential loss remains a possible outcome, and wherein determining the average comprises limiting the difference between the present value distribution of contingent future benefits and the present value of the contingent future investment to a minimum value of zero in instances in which the present value distribution of contingent future benefits is less than a difference of the present value of the contingent future investment and the potential loss.

4. A method according to claim 1 wherein determining the present value distribution of contingent future benefits comprises determining the present value distribution of contingent future benefits of a distribution of contingent future benefits that has a non-log normal distribution.

5. A method according to claim 1 wherein determining the present value of the contingent future investment comprises determining the present value distribution of contingent future investments of a distribution of contingent future investments required to exercise the contingent claim at the subsequent time.

6. A method according to claim 1 wherein determining the present value of a contingent future investment required to exercise the contingent claim at the subsequent time comprises discounting the contingent future investment by a risk free rate of discounting.

7. A method according to claim 1 wherein determining the present value distribution of contingent future benefits comprises discounting the distribution of contingent future benefits by a weighted average cost of capitol.

8. A method according to claim 1 further comprising:
   repeating the determination of the present value distribution of contingent future benefits, the present value of a contingent future investment and the value of a contingent claim in order to value each of a series of contingent claims; and
   refining the valuation of each contingent claim with the determination of the present value distribution of future benefits of a respective contingent claim comprising determining the present value of the value previously determined for an immediately succeeding contingent claim.

9. A method according to claim 1 wherein a project comprises a pilot phase extending from an initial time to the subsequent time and a commercial phase following the subsequent time and contingent upon the exercise of the contingent claim, wherein the method further comprises obtaining a distribution of net operating profit at the subsequent time contingent upon the exercise of the contingent claim, and wherein the distribution of net operating profit is the distribution of contingent future benefits.

10. A system for performing a contingent claim valuation comprising a processing element capable of determining a present value distribution of contingent future benefits attributable to the exercise of the contingent claim at a subsequent time, wherein said processing element determines the present value by discounting a distribution of contingent future benefits according to a first discount rate, said processing element also capable of determining a present value of a contingent future investment required to exercise the contingent claim at the subsequent time based upon a second discount rate that need not equal the first discount rate, and said processing element further capable of determining a value of the contingent claim based upon the present value distribution of contingent future benefits and the present value of the contingent future investment.

11. A system according to claim 10 wherein said processing element determines the value of the contingent claim by determining an average of the difference between the present value distribution of contingent future benefits and the present value of the contingent future investment.

12. A system according to claim 11 wherein, at the time at which the contingent claim is to be exercised, a potential loss remains a possible outcome, and wherein said processing element limits the difference between the present value distribution of contingent future benefits and the present value of the contingent future investment to a minimum value of zero in instances in which the present value distribution of contingent future benefits is less than a difference of the present value of the contingent future investment and the potential loss.

13. A system according to claim 10 wherein said processing element is capable of determining the present value distribution of contingent future benefits of a distribution of contingent future benefits having a non-log normal distribution.

14. A system according to claim 10 wherein said processing element is capable of determining the present value distribution of contingent future investments of a distribution of contingent future investments required to exercise the contingent claim at the subsequent time.

15. A system according to claim 10 wherein said processing element determines the present value of a contingent future investment required to exercise the contingent claim at the subsequent time by discounting the contingent future investment by a risk free rate of discounting.

16. A system according to claim 10 wherein said processing element determines the present value distribution of contingent future benefits by discounting the distribution of contingent future benefits by a weighted average cost of capitol.

17. A system according to claim 10 wherein said processing element repeats the determination of the present value distribution of contingent future benefits, the present value of a contingent future investment and the value of a contingent claim in order to value each of a series of contingent claims, and wherein said processing element refines the valuation of each contingent claim with the determination of the present value distribution of future benefits of a respective contingent claim being determined based upon the present value of the value previously determined for an immediately succeeding contingent claim.

18. A system according to claim 10 wherein a project comprises a pilot phase extending from an initial time to the subsequent time and a commercial phase following the subsequent time and contingent upon the exercise of the contingent claim, wherein said processing element initially obtains a distribution of net operating profit at the subsequent time contingent upon the exercise of the contingent claim, and wherein the distribution of net operating profit is the distribution of contingent future benefits.

19. A computer program product for performing a method of valuing a contingent claim, the computer program product comprising:

a computer-readable storage medium having computer-executable program code portions stored therein for performing the method, the method comprising:

determining a present value distribution of contingent future benefits attributable to the exercise of the contingent claim at a subsequent time, wherein determining a present value distribution comprises discounting a distribution of contingent future benefits according to a first discount rate;

determining a present value of a contingent future investment required to exercise the contingent claim at the subsequent time based upon a second discount rate that need not equal the first discount rate; and determining a value of the contingent claim based upon the present value distribution of contingent future benefits and the present value of the contingent future investment.

20. A computer program product according to claim 19 wherein determining the value of the contingent claim comprises determining an average of the difference between the present value distribution of contingent future benefits and the present value of the contingent future investment.

21. A computer program product according to claim 20 wherein, at the time at which the contingent claim is to be exercised, a potential loss remains a possible outcome, and wherein determining the average comprises limiting the difference between the present value distribution of contingent future benefits and the present value of the contingent future investment to a minimum value of zero in instances in which the present value distribution of contingent future benefits is less than a difference of the present value of the contingent future investment and the potential loss.

22. A computer program product according to claim 19 wherein determining the present value distribution of contingent future benefits comprises determining the present value distribution of contingent future benefits of a distribution of contingent future benefits that has a non-log normal distribution.

23. A computer program product according to claim 19 wherein determining the present value of a contingent future investment comprises determining the present value distribution of contingent future investments of a distribution of contingent future investments required to exercise the contingent claim at the subsequent time.

24. A computer program product according to claim 19 wherein determining the present value of a contingent future investment required to exercise the contingent claim at the subsequent time comprises discounting the contingent future investment by a risk free rate of discounting.

25. A computer program product according to claim 19 wherein determining the present value distribution of contingent future benefits comprises discounting the distribution of contingent future benefits by a weighted average cost of capitol.

26. A computer program product according to claim 19 wherein the method further comprises:

repeating the determination of the present value distribution of contingent future benefits, the present value of a contingent future investment and the value of a contingent claim in order to value each of a series of contingent claims; and refining the valuation of each contingent claim with the determination of the present value distribution of future benefits of a respective contingent claim comprising determining the present value of the value previously determined for an immediately succeeding contingent claim.

27. A computer program product according to claim 19 wherein a project comprises a pilot phase extending from an initial time to the subsequent time and a commercial phase following the subsequent time and contingent upon the exercise of the contingent claim, wherein the method further comprises obtaining a distribution of net operating profit at the subsequent time contingent upon the exercise of the contingent claim, and wherein the distribution of net operating profit is the distribution of contingent future benefits.

* * * * *